June 2, 1964 J. G. NIGRO 3,135,101
FLEXIBLE TRAY ASSEMBLY FOR FREEZING, STORING AND DISPENSING
ICE CHIPS, FLAKES AND THE LIKE
Filed Sept. 17, 1962 2 Sheets-Sheet 1

INVENTOR.
JOSEPH G. NIGRO
BY
ATTORNEY

June 2, 1964  J. G. NIGRO  3,135,101
FLEXIBLE TRAY ASSEMBLY FOR FREEZING, STORING AND DISPENSING
ICE CHIPS, FLAKES AND THE LIKE
Filed Sept. 17, 1962  2 Sheets-Sheet 2

INVENTOR.
JOSEPH G. NIGRO
BY Richard J. Cowling
ATTORNEY

United States Patent Office 3,135,101
Patented June 2, 1964

3,135,101
FLEXIBLE TRAY ASSEMBLY FOR FREEZING, STORING AND DISPENSING ICE CHIPS, FLAKES AND THE LIKE
Joseph G. Nigro, 2952 Court St., Oceanside, N.Y.
Filed Sept. 17, 1962, Ser. No. 224,079
5 Claims. (Cl. 62—344)

The present invention relates generally to the making of ice chips, ice flakes or fragmentary ice particles, and it has particular relation to a flexible tray assembly for freezing, storing and dispensing ice chips, flakes and the like.

The flexible combination tray assembly is an improvement over the tray shown and described in my prior United States Letters Patent No. 2,674,862, issued April 13, 1954, and reissued on November 8, 1955, under Reissue No. 24,085.

In my aforementioned Letters Patent, there is shown a tray made of a flexible material that is adapted to respond to reciprocal torsional flexing movements about its geometric center in order to chip, flake or break the ice formations into irregularly shaped small fragments or pieces. However, in the operation of flexing, the ice chips had a tendency to fly out of the tray, and, unless the tray was placed in a container, such as a paper or plastic bag, the fragmentary ice chips would fly all over the room where the flexing action had taken place.

The present invention obviates the inherent disadvantages above described, and provides a combination tray assembly having one tray in which the water may be frozen, a division plate which can be removed, and a second tray for collecting the released chips of flaked ice when the tray assembly is suitably flexed, whereupon division plate may be replaced, the ice forming tray suitably filled with fresh water and refrozen without requiring the removal of the flaked ice chips from the storage tray. In this combination tray assembly, the ice chips in the storage tray may readily be removed, when desired, through a closeable opening in the storage tray without requiring removal of the freezing water or ice in the ice forming tray.

An object of the invention is to provide an assembly comprising a combination of an ice forming tray and an ice storage tray made of material that is light-in-weight, durable, economical and efficient for use in freezing water into ice, fracturing the ice into chips or flakes and then discharging such chips or flakes into an attached storage tray from which they can be removed without disassembling the combination.

Another object of the invention is the provision of an assembly of trays capable of making and storing ice chips for use when desired.

A further object of the invention is to provide an assembly of the character described which is capable of being refilled with water for freezing and the making of additional ice chips or ice flakes while storing the chips or flakes previously frozen and released.

Another object of the invention is the provision of an ice tray assembly which not only stores a quantity of removable ice chips or flakes while another quantity is being frozen, but which permits the removal or withdrawal of the frozen chips without disturbing the water being frozen or the frozen unreleased ice.

Other and further objects and advantages of the invention reside in the detailed construction of the several parts, which result in simplicity, economy and efficiency, and which will be apparent from the following description, wherein a preferred embodiment of the invention is shown, reference being had to the accompanying drawings, forming a part hereof, wherein like numerals indicate like parts, in which.

Figure 2:
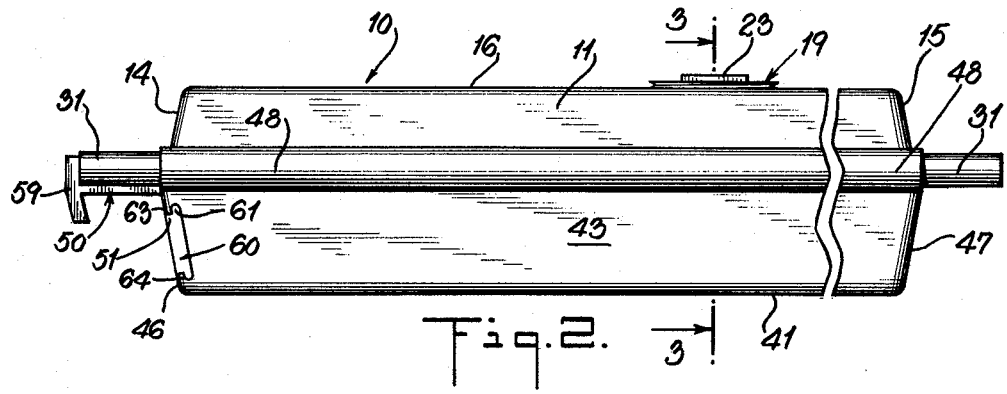
FIGURE 2 is a fragmentary side elevational view of the tray assembly shown in FIGURE 1.
Figure 3:
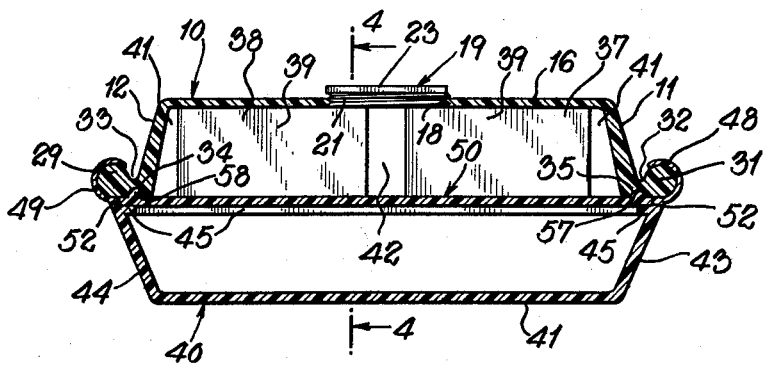
Figure 4:
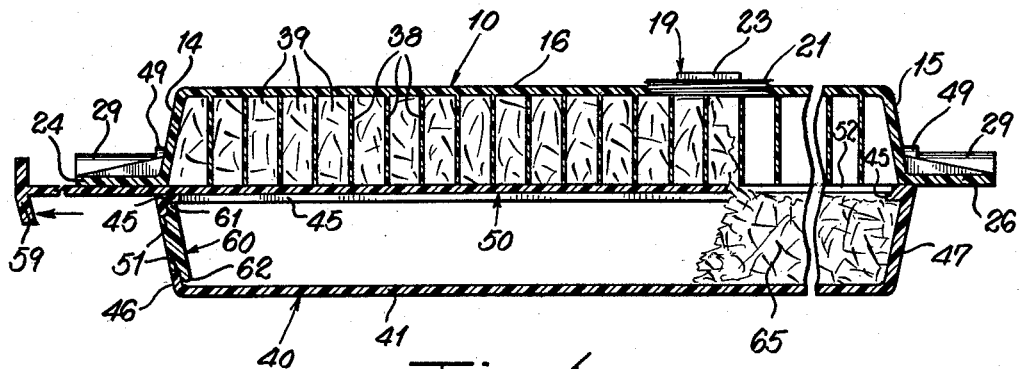

FIGURE 3 is a cross-sectional view of the tray assembly shown in FIGURE 2, the same having been taken substantially along the line 3—3 thereof, looking in the direction of the arrows; and FIGURE 4 is a fragmentary longitudinal sectional view of the tray assembly shown in FIGURE 3, the same having been taken substantially along the line 4—4 thereof, looking in the direction of the arrows, and illustrating the releasing of the ice from the top ice forming tray into the lower ice catching and/or ice storage tray.

The entire tray assembly is preferably made of a plastic material which can be molded, which is non-toxic, tasteless, odorless, flexible at freezing temperatures and capable of being flexed under slight twisting pressures. Obviously, the tray assembly can be made of other suitable materials having these desirable properties and characteristics without departing from the invention.

Figure 1:
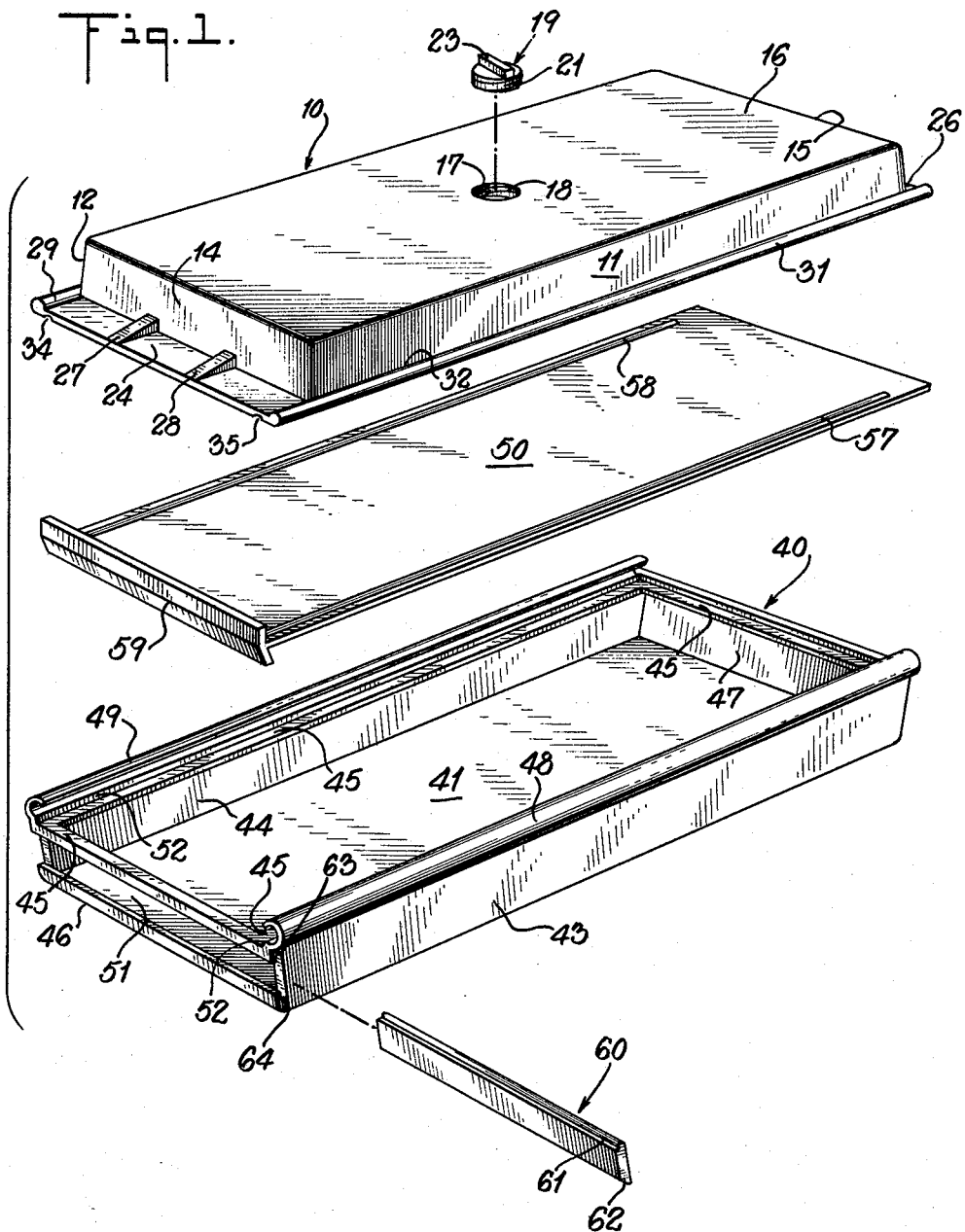
FIGURE 1 is an exploded perspective view of a tray assembly embodying the principles of the invention.

Referring now to the drawings, and particularly to FIGURE 1 thereof, there is shown an ice forming top tray 10, having a substantially rectangular shape, with longitudinally extending sides 11 and 12 and transversely extending ends 14 and 15, a closed top 16 and an open bottom. The top 16 is centrally apertured, as indicated at 17, which aperture is threaded internally, as indicated at 18, to receive a closure plug 19. The closure plug 19 has a threaded shank 21 adapted to fit within the threaded aperture 17, and is provided with a raised diammetrically extending flange 23, which serves as a finger grip for threading and removing the plug 19 from the aperture 17. The ends 14 and 15 are each provided with outwardly extending horizontal flanges 24 and 26, which lie in the plane of the open bottom of the tray 10. These flanges 24 and 26 are suitably reinforced by spaced integrally formed ribs 27 and 28. The flanges 24 and 26 serve as handles for lifting and manipulating the tray assembly. The tray 10 is provided along opposite sides with longitudinally extending and integrally formed beaded edges or ribs 29 and 31, which provide means adapted to engage suitable cooperating means formed integrally with the bottom of the storage tray 40 for securing the trays together slidably and removably. The web formations 32 and 33 (see FIGURE 3), which connect the beaded ribs 29 and 31 with the sides 11 and 12 of the tray 10 in substantially the plane of its open bottom, are each recessed upwardly substantially semicircular in cross-section, as indicated at 34 and 35, respectively. The grooves or recesses 34 and 35 provide spaced tracks for slidably receiving a division or closure plate 50, which will hereinafter be more fully described.

The tray 10 is subdivided by a series of longitudinally spaced and transversely extending web formations, which are formed integrally with and project downwardly from its closed top 16. These web formations are shown arranged in two transversely spaced rows 37 and 38, and the formations of each row are suitably spaced longitudinally, as indicated at 39. The web formations of each row 37 and 38 are also spaced from each other and transversely from the sides 11 and 12 of the tray 10, as indicated at 41 and 42. However, it is to be understood that the arrangement and spacing of the web formations is not critical and any suitable arrangement capable of forming small ice pieces that are relatively thin as compared to their height and length dimensions and will be fragmented upon flexing of the tray 10 will be satisfactory.

The bottom or storage tray 40 is of the same general shape as the top tray 10 but it is slightly larger in cross-section. The bottom tray 40 has a closed bottom 41, outwardly and upwardly sloping sides 43 and 44 and outwardly and upwardly sloping ends 46 and 47. The end 46 is provided with an enlarged opening 51, which serves as a means for removing or dispensing the stored ice chips or flakes therefrom. It is adapted to be closed normally by a sliding closure plate 60. The upper edges of the sides 43 and 44 and the upper edges of the ends 46 and 47 have a circumferentially extending narrow flange 45, which lies in the plane of its open top and serves as a support for receiving a longitudinally slidable and removable division or baffle plate 50. Formed integrally with the outer edges of the flange 45 along the sides 43 and 44 and the end 47 is a raised shoulder 52. Integrally formed and arcuate flanges 48 and 49 project outwardly and upwardly along the sides 43 and 44, respectively. The arcuate flanges 48 and 49 are of a size and shape to telescopically slide and fit snugly over the beaded ribs 29 and 31, respectively.

The division plate 50 is substantially the size and shape of the open top of the bottom tray 40, except for its length, and it has beaded protuberances or ribs 57 and 58, which are semicircular in shape, formed integrally along its top longitudinal side edges for substantially its entire length. These protuberances 57 and 58 are so shaped and spaced that, when the plate 50 is mounted between the trays 10 and 40 on the flange 45, they will fit slidably within the arcuate grooves 34 and 35, respectively, formed in the bottom edges of the top tray 10. The plate 50 is also provided at one end with an integrally formed flange 59, which acts as a stop for limiting the distance the plate 50 may be inserted between the trays 10 and 40 and as a handle for manipulating the same during the operations of removal and/or assembly.

The closure plate 60 for the dispensing opening 51 in the end 46 of the tray 40 has its longitudinal edges grooved adjacent their top and bottom sides, as indicated at 61 and 62, providing a recessed flanged edge adapted to dovetail slidably in corresponding grooves 63 and 64 formed in the adjacent ends of the sides 43 and 44, as best shown in FIGURES 2 and 4.

In the assembly of the combination trays 10 and 40, the following steps are to be followed: The top tray 10 is inverted so that its open bottom is down and its aperture 17 with its closure plug 18 extends upwardly. The bottom tray 40 is now telescopically fitted by sliding its arcuate flanges 47 and 48 over the enlarged beaded ribs 29 and 31, respectively, of the top tray 10, starting from either end. When the trays 10 and 40 are assembled telescopically into a single vertical plane, their inner compartments form a single chamber. The division plate 50 is now ready to be placed into its final position by sliding its free end forwardly on the flange 45 and between the shoulders 51 with its beaded protuberances 57 and 58 fitting into the corresponding grooves 34 and 35. The division plate 50 is moved inwardly until its flanged handle 59 engages the projecting end of the flange 24, as best shown in FIGURE 2, whereupon it completely closes and seals off the open bottom of the top tray 10 and the open top of the bottom tray 40, dividing the single chamber into two chambers of approximately equal size. The removable end closure plate 60 may now be positioned within its corresponding opening 51 in the end 46 of the bottom plate 40 by sliding its flanged edges 61 and 62 into the corresponding grooves 63 and 64, respectively, in the ends of the sides 43 and 44 of the bottom tray 40. Whereupon, the opening 51 in the end 46 of the bottom tray 40 will be completely closed.

The tray assembly is now ready for use. To fill the ice forming tray 10 with fresh water, the plug 19 is removed and water is poured into the opening 17 until it is substantially filled to within a short distance of the tops of the web formations 37 and 38. The reason for not completely filling the tray 10 to the tops of the web formations 37 and 38 is to allow room for expansion of the water upon freezing. The plug 19 may now be replaced, and the tray assembly placed in a freezing compartment of a conventional freezer (not shown) for freezing the water into ice.

When the water in the tray 10 of the tray assembly has become frozen solidly, the assembly may be removed from the freezing chamber. It is now ready to be flexed by twisting between the hands of the holder. This can be done by merely holding the opposite ends of the tray assembly in each hand, and twisting or flexing the same as described in greater detail in my aforementioned Letters Patent. This action will cause the ice formations 65 between the webs 37 and 38 and the sides and ends of the tray 10 to fracture and be released from the slight bond formed with the inner surfaces of the tray 10 and said web formations during the freezing operation. The fracturing of the ice gives off a cracking sound that can readily be recognized and heard.

Thereupon, the division plate 50 may be withdrawn longitudinally, as partially illustrated in FIGURE 4. As the division plate 50 is withdrawn, the ice chips, ice flakes or ice fragments 65 formed in the upper tray 10 by the flexing operation will gravitate into the lower tray 40. Such ice fragments 65 are now ready for use, and can be discharged, if desired, from the tray 40 by withdrawing the end closure plate 60 in the end 46 and pouring the pieces through such opening.

However, if the newly made ice chips, ice flakes or ice fragments are not to be used immediately, the division plate 50 may be reinserted, as previously described, as soon as all of the ice fragments gravitate from the tray 10 to the tray 40. Thereupon, the plug 19 may be removed and fresh water may be poured into the aperture 17 to again fill the tray 10, the plug 19 is now ready to be threaded into place, and the assembly replaced in a freezing chamber for the freezing of the fresh water within the refilled tray 10. The tray assembly will now have water to be frozen in the upper tray 10 and flake ice or ice chips 65 ready for use in the lower tray 40. Since the assembly of the trays 10 and 40 are water tight, the same may be removed at any time from the freezing chamber regardless of whether or not the water therein has been completely frozen for the removable of the ice flakes or ice chips stored in the bottom tray 40. Since the ice chips or ice flakes 65 were never subjected to a melting temperature to effect their release from the inner surfaces and web formations of the tray 10, it is obvious that they will have no tendency to adhere together while stored in the lower tray 40 under refrigerated conditions for future use. It will also be apparent that newly formed ice cannot be released and discharged from the tray 10 into the tray 40 unless the latter has been emptied of its previously formed ice flakes or ice chips 65 since these trays are substantially of the same size.

The tray assembly of the present invention permits the ready formation of ice chips or ice flakes, and their release into the storage tray without danger of having fractured ice chips flying all about. No bag or other container is required to catch the released newly formed ice chips or ice flakes. New ice can be frozen while the previously made ice chips or ice flakes are being stored or used. The operation of making ice chips or ice flakes is substantially continuous, and the tray assembly need not be dis-assembled for repeated cycles of use. However, the tray assembly is made for easy assembly and dis-assembly for washing and cleaning the inside surfaces of the trays 10 and 40 from time to time as may be desired.

Although I have only described in detail but one form which the invention may assume, it will be readily apparent to those skilled in the art that the invention is not to be so limited, but that various other and further modifications may be made therein without departing from the spirit thereof.

What I claim is:

1. A flexible assembly comprising an ice freezing tray and an ice storage tray for producing, storing and dispensing ice chips, (1) said ice freezing tray having an open bottom, closed top and sides,
(2) said ice freezing tray having a series of spaced web-formations which divide its interior into a plurality of sub-divisions that are relatively thin as compared to their height and length dimensions,
(3) said ice freezing tray having an opening in its closed top,
(4) said ice storage tray having an open top,
(5) means for securing said ice freezing tray and said ice storage tray with the open bottom and top juxtapositioned to form a closed chamber, and
(6) removable means in liquid sealing relation with said ice freezing tray for dividing said chamber into a liquid freezing compartment and an ice storage compartment.

2. A flexible assembly comprising an ice freezing tray and an ice storage tray for producing, storing and dispensing ice chips,
(1) said ice freezing tray having an open bottom, a closed top and sides,
(2) said ice freezing tray having a series of spaced web-formations which divide its interior into a plurality of subdivisions that are relatively thin as compared to their height and length dimensions,
(3) said ice freezing tray having an opening in its closed top,
(4) removable means for closing said opening,
(5) said ice storage tray having an open top and an open side,
(6) removable means for closing said open side,
(7) means for securing said ice freezing tray and said ice storage tray with their open bottom and top in juxtaposition to form a closed chamber, and
(8) removable means in liquid sealing relation with said ice freezing tray for dividing said chamber into a liquid freezing compartment and an ice storage compartment.

3. A flexible assembly comprising an ice freezing tray and an ice storage tray for producing, storing and dispensing ice chips,
(1) said ice freezing tray having an open bottom, a closed top and sides,
(2) said ice freezing tray having a series of spaced web-formations which divide its interior into a plurality of sub-divisions that are relatively thin as compared to their height and length dimensions,
(3) said ice freezing tray having an opening in its closed top and removable means for closing said opening,
(4) said ice freezing tray having laterally projecting means extending along opposite sides for engaging a cooperative securing means,
(5) said ice storage tray having an open top and laterally projecting cooperative securing means extending along opposite sides of said open top for engaging the laterally projecting means of the ice freezing tray, whereby when said securing means are cooperatively and slidably joined together the open top and open bottom of said trays are in juxtaposition to form a closed chamber, and
(6) removable means in liquid sealing relation with said ice freezing tray for dividing said chamber into an ice freezing compartment and an ice storage compartment.

4. A flexible assembly comprising an ice freezing tray and an ice storage tray for producing, storing and dispensing ice chips,
(1) said ice freezing tray having an open bottom, a closed top and sides,
(2) said ice freezing tray having a series of spaced web-formations which divide its interior into a plurality of sub-divisions that are relatively thin as compared to their height and length dimensions,
(3) said ice freezing tray having an opening in its closed top and removable means for closing said opening,
(4) said ice freezing tray having laterally projecting ribs extending along opposite sides thereof for receiving cooperating means carried by an ice storage tray,
(5) said ice storage tray having an open top and an open side with removable means for closing said opening in said side,
(6) said ice storage tray having laterally projecting curved flanges extending along opposite sides for slidably engaging the ribs of said ice storage tray when said trays are assembled with their open faces juxtapositioned to form a closed chamber, and
(7) removable means in liquid seating relation with said ice freezing tray for dividing said chamber into an ice freezing compartment and an ice storage compartment.

5. A flexible assembly comprising an ice freezing tray and an ice storage tray for producing, storing and dispensing ice chips,
(1) said ice freezing tray having an open bottom, a closed top and sides,
(2) said ice freezing tray having a series of spaced web-formations which divide its interior into a plurality of sub-divisions that are relatively thin as compared to their height and length dimensions,
(3) said ice freezing tray having an opening in its closed top for filling the same with water to be frozen,
(4) said ice freezing tray having a removable plug for closing said opening in its top,
(5) said ice freezing tray having spaced guide means for receiving slidably in liquid sealing relation a closure plate over its open bottom,
(6) said ice storage tray having an open top and an opening in one of its sides through which the stored ice chips may be removable without dismantling the assembly,
(7) removable means for closing said opening in said side,
(8) said ice storage tray having spaced guide means adapted to cooperate slidably with said guide means on said ice freezing tray to secure the trays together as an assembly,
(9) said ice storage tray having means for removably receiving a slidable plate for closing and liquid sealing said ice freezing tray from said ice storage tray, whereby water may be frozen in said ice freezing tray while ice chips may be stored in said ice storage tray.

References Cited in the file of this patent

UNITED STATES PATENTS

| | | |
|---|---|---|
| 1,226,634 | Briese | May 22, 1917 |
| 1,931,053 | Berkeley | Oct. 17, 1933 |
| 2,839,899 | Baillif | June 24, 1958 |